United States Patent [19]

Oellerking

[11] 4,286,007

[45] Aug. 25, 1981

[54] REPAIR PATCH FOR CONTAINER AND LORRY SHEETS

[75] Inventor: Willi Oellerking, Schleswig, Fed. Rep. of Germany

[73] Assignee: Schleswiger Tauwerkfabrik Christian Oellerking, Schleswig, Fed. Rep. of Germany

[21] Appl. No.: 13,251

[22] Filed: Feb. 21, 1979

[30] Foreign Application Priority Data

Feb. 22, 1978 [DE] Fed. Rep. of Germany ....... 2807439

[51] Int. Cl.³ .......................... B32B 3/06; B32B 35/00
[52] U.S. Cl. ...................................... 428/194; 156/94; 264/36; 427/140; 427/285; 428/63; 428/66; 428/200; 428/262; 428/912; 428/913
[58] Field of Search ...................... 156/94, 98; 264/36; 427/140, 284, 285; 428/63, 192, 194, 200, 262, 290, 912, 913, 64, 66, 79, 347, 349, 354, 261

[56] References Cited

U.S. PATENT DOCUMENTS

| | | | |
|---|---|---|---|
| 3,509,003 | 4/1970 | Engle | 428/79 X |
| 3,620,865 | 11/1971 | Golumbic | 156/98 |
| 3,887,413 | 6/1975 | Speer | 156/94 |
| 4,086,113 | 4/1978 | Cataffo et al. | 156/98 |
| 4,135,017 | 1/1979 | Hoffman | 156/94 X |
| 4,147,576 | 4/1979 | Beem et al. | 156/94 |

FOREIGN PATENT DOCUMENTS

2401506   7/1975   Fed. Rep. of Germany ............. 156/94

Primary Examiner—Bruce H. Hess
Attorney, Agent, or Firm—Bell, Seltzer, Park and Gibson

[57] ABSTRACT

A repair patch made of fabric coated with weldable plastics material for repairing sheets and used as covers for goods vehicle or containers. The patch comprises a sealing strip of weldable plastics material for sealing the circumference of the material of the patch to a sheet by welding, and the sealing strip is non-detachably connected to the material of the patch leaving a projecting margin of the strip which is to be welded to the sheet.

To provide a preliminary connection, the sealing strip may be connected to the material of the patch by welding or bonding.

4 Claims, 3 Drawing Figures

REPAIR PATCH FOR CONTAINER AND LORRY SHEETS

BACKGROUND OF THE INVENTION

The present invention relates to repair patches for the protective sheets of containers and lorries.

In the event of damage, sheets which are used to cover the loading openings of containers, lorries or the like used in international goods transportation, must be repaired in such a way that the customs seal is preserved. To make such a repair, the procedure hitherto has been to detach at least part of the sheet from the container or vehicle, lay it on a solid, flat support and then apply the repair patch to the damaged area. To meet customs regulations, after it has been applied the patch which is to be welded to the sheet must be sealed with an additional plastics strip, and the sealing strip must be welded on where it overlaps with the edge of the patch in the same welding operation as is used to weld the patch to the sheet. For this purpose, the patch is first of all laid on the detached sheet and then the beginning of the sealing strip is placed in position separately with its centre on the edge of the patch, after which a hand welding device is used to perform the welding operation, which takes place around the entire circumference of the patch, the sealing strip being guided separately with the other hand.

Because of the time-consuming detachment and re-attachment of the sheet to be repaired and because of the often adverse weather conditions on the site, generally in a port, and furthermore because of the considerable size and thus weight of the sheet, the repair operations are time-consuming and laborious. However, apart from this, even an expert can only carry out the operation if he works very carefully since it is extremely difficult to weld the relatively narrow sealing strip, which has to be guided separately by hand, around the entire circumference of the path covering its edge and accurately and leaving a sufficient margin for the seal made with the strip to be acknowledged as secure from the customs point of view. Since such repairs are very difficult to make on site, the sheets have to be taken to a repair shop, meaning that, as will be appreciated, the repair becomes very expensive or even that, in certain circumstances, it cannot be made for lack of skilled personnel.

It is an object of the invention to provide a repair patch for sheets which are intended in particular for covering the loading openings of containers used in international goods transportation, which is prepared ready for use, in such a way that it is easy even for unskilled labor to weld it on site, to the sheet to be repaired, in such a way that the repair can be considered secure from the customs point of view.

SUMMARY OF THE INVENTION

Accordingly, the invention consists in a repair patch made of fabric coated with weldable plastics material for repairing sheets used as covers for goods vehicles or containers comprising a sealing strip of weldable plastics material for sealing the circumference of the material of said patch to a sheet by welding, said sealing strip being non-detachably connected to said material of said patch leaving a projecting margin of said strip which is to be welded to the sheet.

The repair patch according to the invention enables repairs which are secure from the customs point of view to be made easily and cheaply to sheets used for the purpose mentioned, which repairs can, in addition, be made by unskilled persons. Also, the repair is simple to make on the spot without the need for the sheet to be detached. In all cases it is ensured that the sealing strip overlaps equally on both sides of the circumferential edge of the patch for the prescribed minimum distance and can be properly welded both to the patch and to the sheet. The welding of the material of the patch to the sheet and of the sealing strip to both these materials in a single welding operation now presents no problems since when making the repair all that now has to be guided is a hand-welding device since the material of the patch is already nondetachably connected to the sealing strip.

Advantageously, the sealing strip is connected to the material of the patch by a preliminary welding operation, which may be considered a very simple and effective method of connection. Alternatively, it is possible to use a bonded connection, since when the patch is finally welded to the sheet, the sealing strip is permanently welded on at the same time.

BRIEF DESCRIPTION OF THE DRAWINGS

In order that the invention may be more clearly understood, reference will now be made to the accompanying schematic drawings, which show one embodiment thereof by way of example, and in which.

DETAILED DESCRIPTION OF A PREFERRED EMBODIMENT

Figure 1:
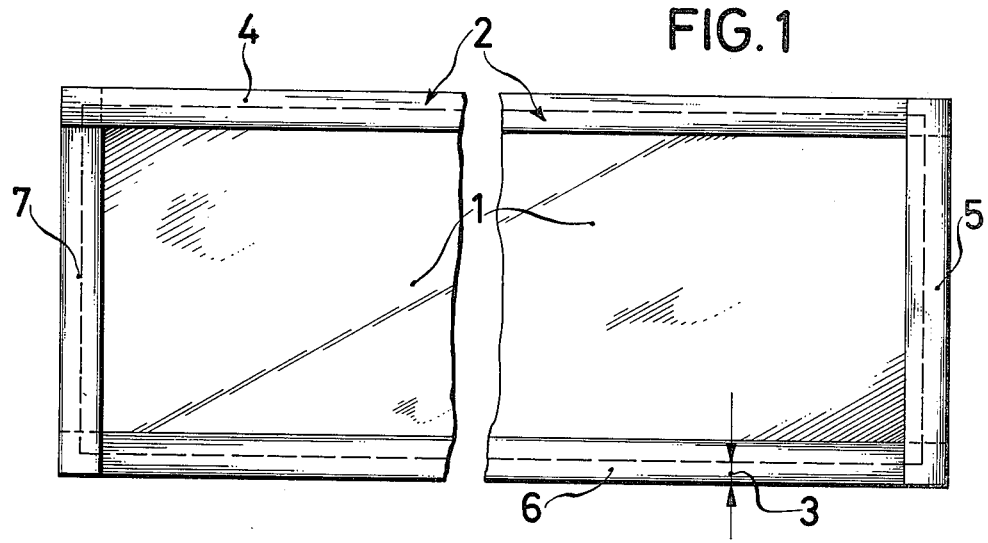
FIG. 1 is a plan view of the upper face of a patch according to the invention.

Referring now to the drawings, the patch shown in FIG. 1 comprises the patch material proper 1, which is made from a fabric coated with weldable plastics material, and a weldable sealing strip 2 which is firmly connected to the patch material around its entire periphery with a prescribed minimum margin 3 which will later be welded to a sheet when a repair is made. The sealing strip 2 may consist of individual lengths 4, 5, 6 and 7 which overlap at their ends. For simplicity's sake, the strip is connected beforehand to the material of the patch in the correct position by welding, in which case a continuous weld seam is not absolutely essential and it is also possible to use a tack weld consisting for example of spaced spot welds. Alternatively, the preliminary connection may be made by bonding but the adhesive must not detract from the final welded joint which will subsequently be made.

Figure 2:
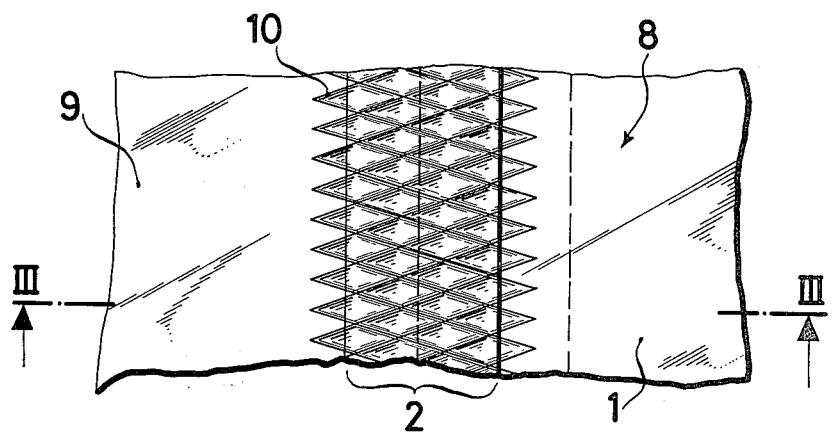
FIG. 2 is a plan view of part of a repair made with a patch according to the invention.

The fragmentary view in FIG. 2 shows the area of weld between the patch and a sheet to an enlarged scale. The patch 8 is welded to the sheet 9, the entire width of the weld seam being formed, as called for by the regulations, with relief 10 which is wider than the sealing strip 2 and which is indicated in the drawing by cross-hatching.

Figure 3:
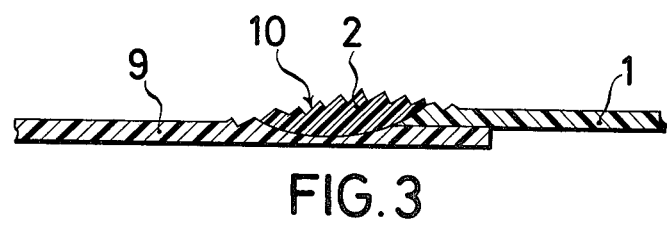
FIG. 3 is a sectional view on line III—III of FIG. 2.

FIG. 3 is a schematic view in section of the weld seam after the repair to the sheet 9 has been completed. It can be seen that the material 1 of the patch has formed a solid joint with the sheet 9 and that the sealing strip 2 has done likewise with both these materials, which is indicated symbolically by the black shading. The zigzag upper boundary of the shading is intended to represent the relief 10.

Connecting the patch 8 to the sheet 9 is extremely simple. The patch is simply laid on the damaged region of the sheet, with a flat, solid plate or the like being held against the other side of the tarpaulin to provide support for a hand welding tool of a known kind. The hand welding tool is then guided along the sealing strip 2 around the entire circumference of the patch 8, at which time the welding takes place. In the course of this operation, it is no longer necessary to hold the sealing strip individually since, in accordance with the invention, it is now a permanent part of the patch. In this way an easy and cheap repair can be made to sheets which satisfies customs regulations.

However, the patch described above is suitable not only for repairing sheets which are used to shut in goods which are transported internationally but can also be used for any other sheets to which it can be welded.

I claim:

1. A repair patch for use in repairing damaged areas in protective cover sheets for loading openings of containers, lorries, or the like utilized in international goods transportation wherein, to satisfy customs regulations, a sealing strip must be attached around the periphery of the patch and overlapping the patch and the cover sheet and embossed with a relief pattern so that once the patch has been applied to the cover sheet, any tampering with the patch will be readily discoverable, said repair patch comprising:

a piece of fabric having outer and inner surfaces and peripheral edges defining an area of predetermined size and shape for covering the damaged area in the cover sheet;

a coating of a weldable plastic material on at least the inner surface of said piece of fabric for welding the fabric to the cover sheet over the damaged area; and an elongate sealing strip of an embossable, weldable thermoplastic material connected to the outer surface of said piece of fabric and extending around the periphery thereof, with portions of the sealing strip projecting outwardly beyond said peripheral edges of the fabric to form a circumferential outwardly projecting margin for welding to the cover sheet when the piece of fabric is positioned over the damaged area of the cover sheet and said weldable coating is secured to the cover sheet.

2. A repair patch as set forth in claim 1 in which said sealing strip is connected to the outer surface of said piece of fabric by welding of the thermoplastic sealing strip to the piece of fabric.

3. A repair patch as set forth in claim 1 in which said sealing strip is connected to te outer surface of said piece of fabric by adhesive bonding.

4. A repair patch for use in repairing damaged areas in protective cover sheets for loading openings of containers, lorries or the like used in international goods transportation wherein, to satisfy customs regulations, a sealing strip must be attached around the periphery of the patch and overlapping the patch and the cover sheet and embossed with a relief pattern so that once the patch has been applied to the cover sheet, any tampering with the patch will be readily discoverable, said repair patch comprising:

a piece of fabric of generally rectangular configuration having outer and inner surfaces and respective peripheral edges defining a generally rectangular area of predetermined size and shape for covering the damaged area in the cover sheet, a coating of a weldable plastic material on at least the inner surface of said piece of fabric for welding said fabric to the cover sheet over the damaged area; and respective elongate strips of an embossable, weldable thermoplastic material connected to the outer surface of said piece of fabric and extending around the periphery thereof, each strip being positioned overlying a respective peripheral edge of the fabric with a portion of the width of the strip positioned overlying and being connected to the outer surface of said piece of fabric and with the remaining portions of the width of the strip projecting outwardly beyond the peripheral edge of the fabric, and wherein the end portions of the respective strips are positioned in overlapping relation with the end portions of adjacent strips so that the respective strips collectively form a circumferential outwardly projecting margin around the periphery of the piece of fabric for welding to the cover sheet when the piece of fabric is positioned over the damaged area of the cover sheet and said weldable coating is secured to the cover sheet.

* * * * *

REEXAMINATION CERTIFICATE (2795th)

United States Patent [19]

Oellerking

[11] B1 4,286,007

[45] Certificate Issued Feb. 13, 1996

[54] REPAIR PATCH FOR CONTAINER AND LORRY SHEETS

[75] Inventor: Willi Oellerking, Schleswig, Germany

[73] Assignee: Schleswiger Tauwerkfabric Oellerking GmbH & Co. KG, Schleswig, Germany

Reexamination Request:
No. 90/003,600, Oct. 13, 1994

Reexamination Certificate for:
Patent No.: 4,286,007
Issued: Aug. 25, 1981
Appl. No.: 13,251
Filed: Feb. 21, 1979

[30] Foreign Application Priority Data

Feb. 22, 1978 [DE] Germany .................. 2807439

[51] Int. Cl.$^6$ ............... B32B 3/06; B32B 35/00
[52] U.S. Cl. ............... 498/194; 156/94; 264/36; 427/140; 427/285; 428/63; 428/66.4; 428/200; 428/262; 428/912; 428/913
[58] Field of Search ............... 156/94, 98; 264/36; 427/140, 284, 285; 428/63, 64, 66, 79, 192, 194, 200, 261, 262, 290, 347, 349, 354, 912, 913

[56] References Cited

PUBLICATIONS

Pp. 1–9 of Annex 2 of the 1975 TIR Convention (Customs Convention on the International Transport of Goods under cover of TIR Carnets).

Modified Text of Article 5 of Annex 3 to the Customs Convention on the International Transport of Goods under cover of TIR Carnets signed at Geneva on Jan. 15, 1959.

Coast Guard Certification of Cargo Containers for Transport under Customs Seal.

*Primary Examiner*—Bruce H. Hess

[57] ABSTRACT

A repair patch made of fabric coated with weldable plastics material for repairing sheets and used as covers for goods vehicle or containers. The patch comprises a sealing strip of weldable plastics material for sealing the circumference of the material of the patch to a sheet by welding, and the sealing strip is non-detachably connected to the material of the patch leaving a projecting margin of the strip which is to be welded to the sheet.

To provide a preliminary connection, the sealing strip may be connected to the material of the patch by welding or bonding.

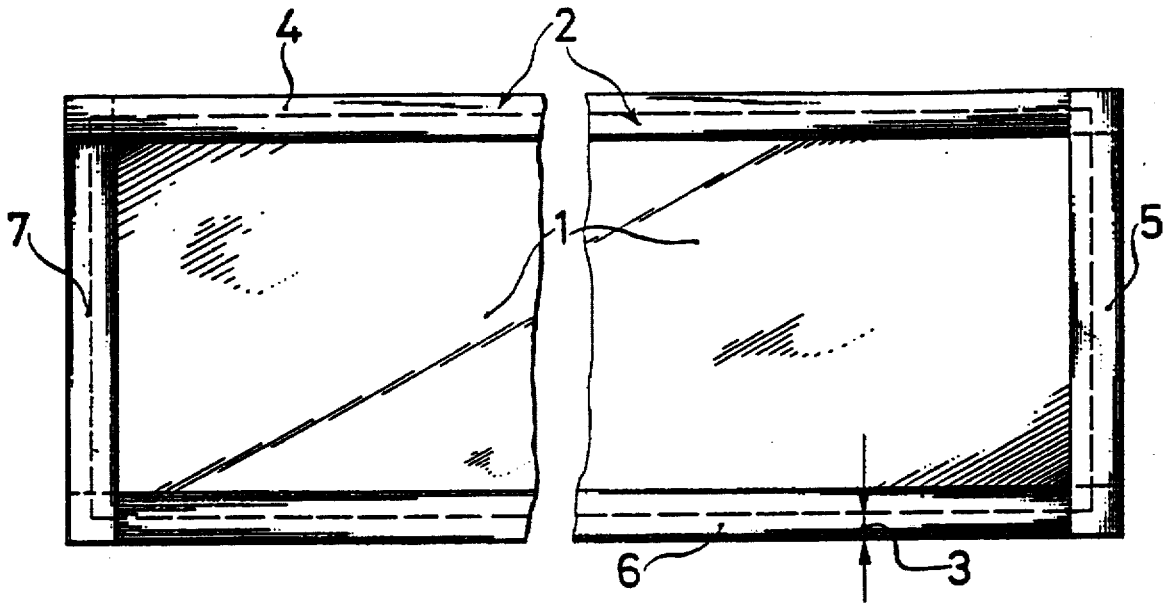

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–4 is confirmed.

* * * * *